(12) United States Patent (10) Patent No.: US 7,808,347 B2
Song (45) Date of Patent: Oct. 5, 2010

(54) YOKE AND MANUFACTURING METHOD THEREOF

(75) Inventor: Chang Yeol Song, Osan (KR)

(73) Assignee: LG Electronics Inc., Seoul (KR)

( * ) Notice: Subject to any disclaimer, the term of this patent is extended or adjusted under 35 U.S.C. 154(b) by 783 days.

(21) Appl. No.: 11/790,862

(22) Filed: Apr. 27, 2007

(65) Prior Publication Data

US 2007/0262657 A1 Nov. 15, 2007

(30) Foreign Application Priority Data

Apr. 28, 2006 (KR) ...................... 10-2006-0038929

(51) Int. Cl.
*H01F 3/00* (2006.01)
(52) U.S. Cl. .................................... 335/297
(58) Field of Classification Search ......... 335/296–298; 359/198.1, 199.3, 200.7, 703, 813, 814, 824
See application file for complete search history.

(56) References Cited

U.S. PATENT DOCUMENTS

| | | | | |
|---|---|---|---|---|
| 5,241,422 A | * | 8/1993 | Shimada et al. | 359/694 |
| 5,471,100 A | * | 11/1995 | Sakamoto et al. | 310/12.04 |
| 5,615,053 A | * | 3/1997 | Toyama et al. | 359/813 |
| 5,892,628 A | * | 4/1999 | Ikari | 359/813 |
| 6,069,867 A | * | 5/2000 | Ikegame | 369/248 |
| 6,449,229 B1 | * | 9/2002 | Kim et al. | 369/53.19 |
| 6,580,569 B2 | * | 6/2003 | Choi et al. | 359/814 |
| 6,704,255 B2 | * | 3/2004 | Tanaka | 369/44.14 |
| 6,791,772 B2 | * | 9/2004 | Wakabayashi et al. | 359/824 |
| 6,859,325 B2 | * | 2/2005 | Kato et al. | 359/618 |
| 7,012,737 B2 | * | 3/2006 | Iwasaki et al. | 359/298 |
| 7,095,549 B2 | * | 8/2006 | Iwasaki et al. | 359/298 |
| 7,599,137 B2 | * | 10/2009 | Shin et al. | 359/813 |
| 2004/0027674 A1 | * | 2/2004 | Kato et al. | 359/618 |
| 2005/0024750 A1 | * | 2/2005 | Kato | 359/813 |
| 2005/0099709 A1 | * | 5/2005 | Iwasaki et al. | 359/872 |
| 2005/0134974 A1 | * | 6/2005 | Yamada | 359/813 |
| 2006/0098313 A1 | * | 5/2006 | Iwasaki et al. | 359/872 |
| 2007/0177283 A1 | * | 8/2007 | Kimura et al. | 359/824 |

* cited by examiner

*Primary Examiner*—Ramon M Barrera
(74) *Attorney, Agent, or Firm*—Birch, Stewart, Kolasch & Birch, LLP

(57) ABSTRACT

A yoke, as embodied, includes a base having a center vent; at least a pair of inner yoke portions respectively located at both end edges of the center vent and protruding from the base to face each other, each of the inner yoke portions having a support protrusion, the support protrusions being respectively located at complementary positions of leading ends of the inner yoke portions; and at least a pair of outer yoke portions protruding from the base and facing each other.

5 Claims, 3 Drawing Sheets

YOKE AND MANUFACTURING METHOD THEREOF

CROSS-REFERENCE TO RELATED APPLICATIONS

This Nonprovisional application claims priority under 35 U.S.C. §119(a) on Patent Application No. 10-2006-0038929 filed in Korea on Apr. 28, 2006, the entire contents of which are hereby incorporated by reference.

BACKGROUND OF THE INVENTION

1. Field of the Invention

The present invention relates to a yoke and a manufacturing method thereof, and more particularly, to a yoke which can define a magnetic path in an actuator, and a manufacturing method thereof.

2. Description of the Related Art

A yoke, which is made of a metallic material, is generally manufactured by pressing a metal plate. In more detail, the yoke is consecutively manufactured in a progressive mold. That is, the yoke is formed in a designed shape by passing a base material elongated in a band shape through the progressive mold and sequentially processing the base material. In a process of forming inner yoke portions, the inner yoke portions have a desired height by partially bending and drawing the base material.

The yoke includes a plate-shaped base. The inner yoke portions are formed upright to face each other at both ends of a center vent of a center portion of the base. Two support protrusions are formed at the leading end of each of the inner yoke portions. The leading ends of the support protrusions support a bottom surface of a cover for protecting a coil and an optical member of an actuator.

Meanwhile, a portion between the pair of support protrusions is perforated such that the perforated portion is a path of light emitted to test tracking performance in the production of the actuator. When used in the actuator, the inner yoke portions are installed to pass through a bobbin.

However, the aforementioned related art has the following problems.

In order to form each of the inner yoke portions, only about a half of one side width of the center vent can be used as a length of the inner yoke portion. Therefore, the inner yoke portion should be extended to have a designed length through a drawing process. However, if the drawing process is carried out once in order to obtain the designed value of the inner yoke portion, the inner yoke portions may be ruptured or not be formed in a precise size. Thus, the drawing process should be performed at least twice. Accordingly, it is difficult to form the inner yoke portion and the base portion adjacent thereto to have the size and shape according to the design.

Particularly, since the designed value of the inner yoke portion is at least twice as large as the length in the base material state before the drawing process, it is difficult to control the size of the inner yoke portion due to a crack or rupture. For reference, comparing a thickness t1 of the base material before the drawing process with a thickness t2 thereof after the drawing process, t1 is about a half of t2, i.e., t1=0.5t2. In addition, as the size of the center vent is limited, the increase of the length of the inner yoke portion is restricted.

In the related art, the pair of support protrusions are formed at the leading end of each of the inner yoke portions. Therefore, it is very cumbersome to perform a process of attaching a reflecting plate for measuring a tracking property of the bobbin in the actuator to an objective lens of the bobbin through the inner yoke portions.

SUMMARY OF THE INVENTION

The present invention is conceived to solve the aforementioned problems in the related art. An object of the present invention is to minimize a length change between a base material state and a completed state when forming an inner yoke portion of a yoke.

Another object of the present invention is to form inner yoke portions at both ends of a yoke in symmetry to sufficiently perform necessary functions.

According to an aspect of the present invention for achieving the objects, as embodied, a yoke includes a base having a center vent; at least a pair of inner yoke portions respectively located at both end edges of the center vent and protruding from the base to face each other, each of the inner yoke portions having a support protrusion, the support protrusions being respectively located at complementary positions of leading ends of the inner yoke portions; and at least a pair of outer yoke portions protruding from the base and facing each other.

According to another aspect of the present invention, as embodied, a method of forming a yoke to have at least two inner yoke portions facing each other formed on a base by consecutively processing a base material, comprises: forming two support protrusions in complementary positions of leading ends of the inner yoke portions facing each other by separating a central portion of the base material into two pieces; and forming the two inner yoke portions to protrude from the base by bending the two pieces of the base material, on which the support protrusions have been respectively formed, with respect to the base.

According to still another aspect of the present invention, as embodied, a method for forming a yoke, comprises: providing a base material; removing two portions of the base material to provide a central portion of the base material, the two portions of the base material being located immediately adjacent to the central portion of the base material; separating the central portion of the base material into two pieces, a leading end of one of the two pieces having a shape complementary to a leading end of the other one of the two pieces; and forming two inner yoke portions by bending the two pieces of the base material upward.

BRIEF DESCRIPTION OF THE DRAWINGS

The above objects, and other features and advantages of the present invention will become more apparent after a reading of the following detailed description when taken in conjunction with the drawings, in which.

DETAILED DESCRIPTION OF THE EXEMPLARY EMBODIMENTS

Hereinafter, an exemplary embodiment of a yoke and a manufacturing method thereof according to the present invention will be described in detail with reference to the accompanying drawings.

Figure 1:
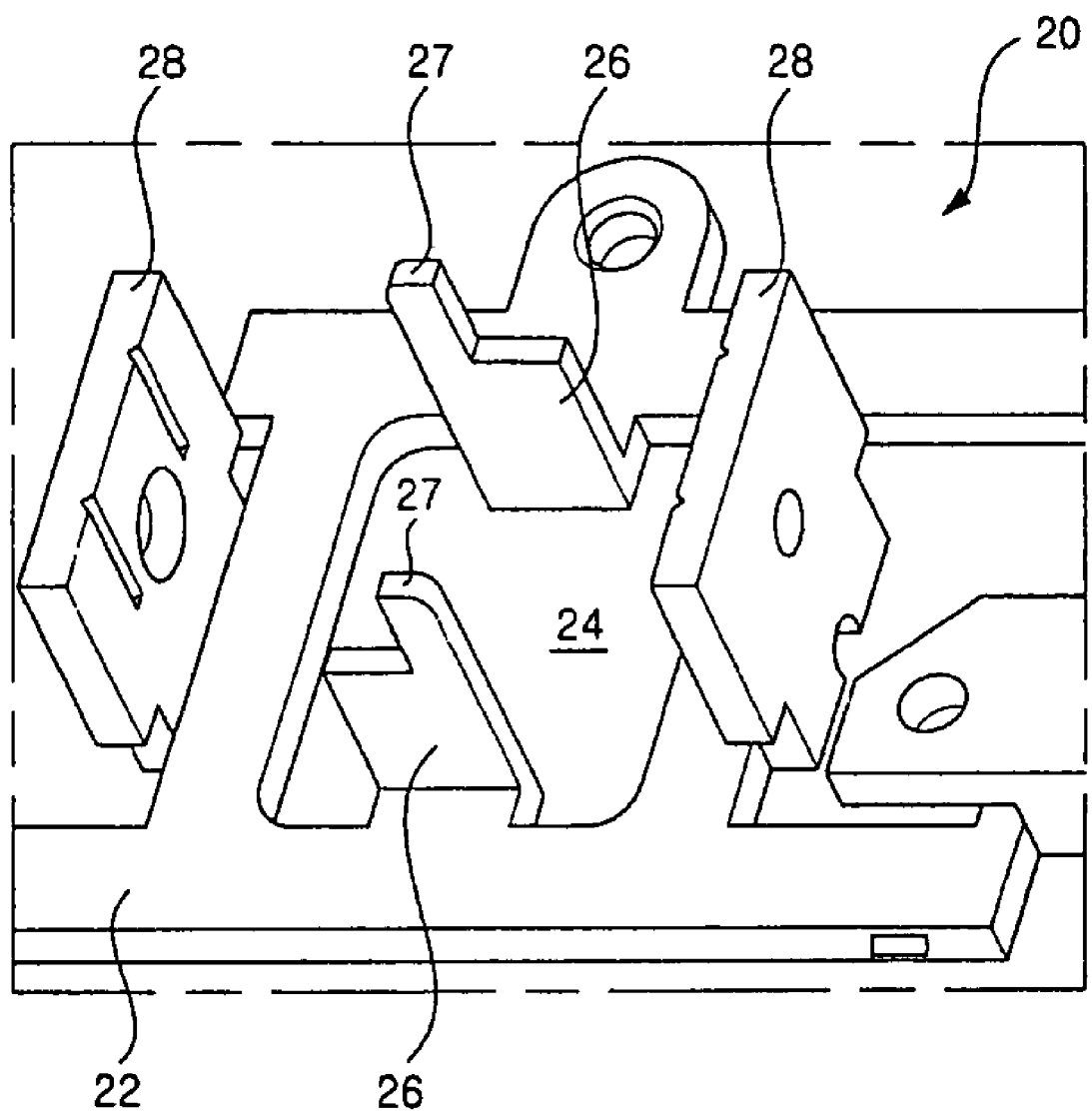
FIG. 1 is a perspective view illustrating a configuration of a preferred embodiment of a yoke according to an exemplary embodiment of the present invention.
Figure 2:
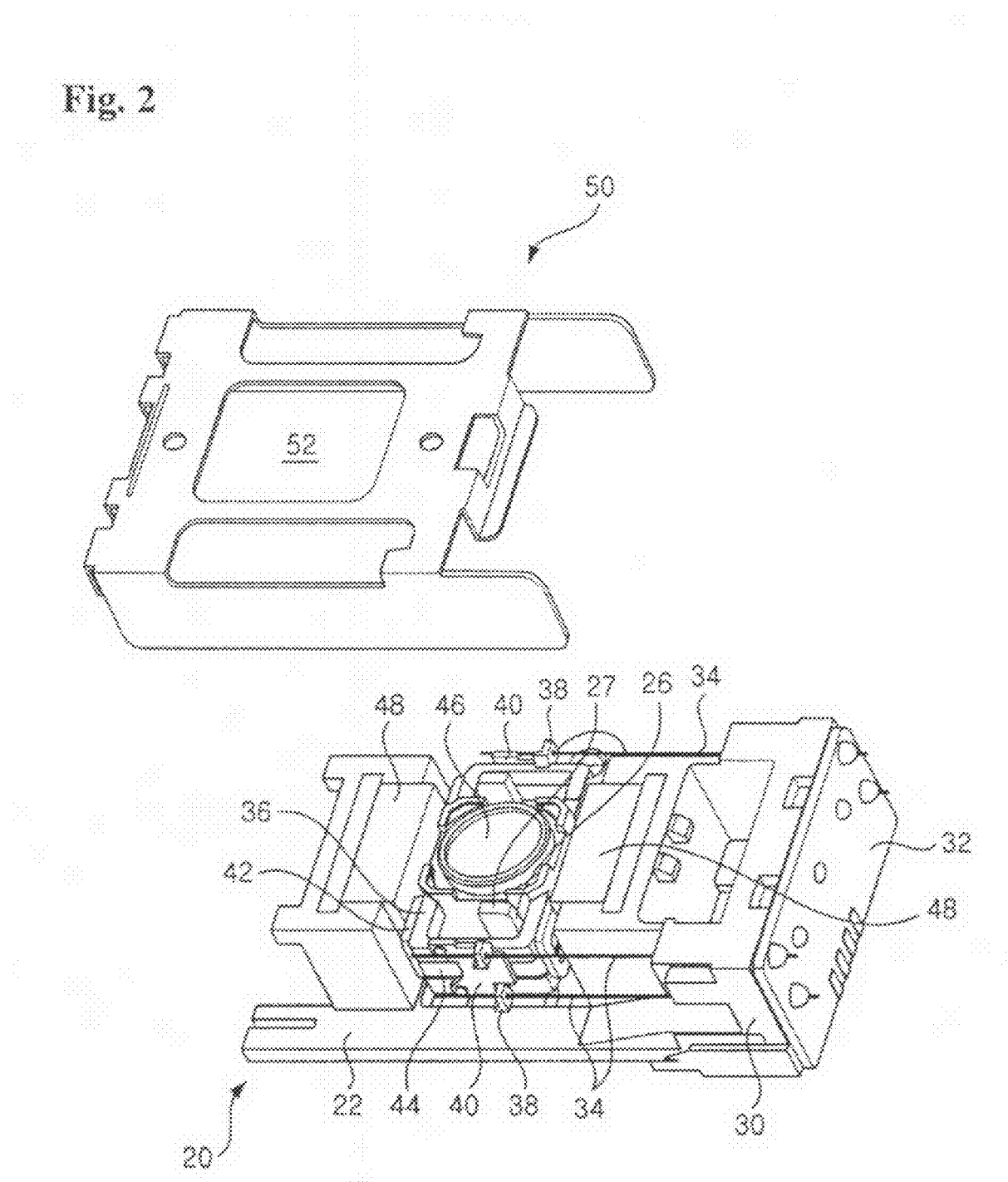
FIG. 2 is an exploded perspective view illustrating a configuration of an actuator, in which the exemplary embodiment of the yoke according to the present invention is employed.

Referring to FIGS. 1 and 2, a yoke 20 of an exemplary embodiment according to the present invention is made of a metallic material. For example, the yoke 20 is manufactured by pressing a metal plate. The yoke 20 includes a base 22. The base 22 is formed in the shape of a generally quadrangular plate. A center vent 24 is formed in a quadrangular shape at a center portion of the base 22. Inner yoke portions 26 are formed upright on the base 22 at opposite edges of the center vent 24.

The inner yoke portions 26 define a path of magnetic flux for operation of an actuator, thereby making it possible to constitute a closed circuit of a magnetic field. In addition, support protrusions 27 are formed to protrude at the leading ends of the inner yoke portions 26, respectively. The support protrusions 27 serve to support a cover 50, which will be described below. The support protrusions 27, which are respectively formed at the leading ends of the inner yoke portions 26 facing each other, are formed at complementary positions. That is, referring to FIG. 1, if one of the support protrusions 27 is formed at the right side of the leading end of one of the inner yoke portions 26, the other support protrusion 27 is formed at the left side of the leading end of the other inner yoke portion 26. Each of the support protrusions 27 is formed to be offset to a side with respect to a center of the leading end of the corresponding inner yoke portion 26.

The width of the support protrusion 27 is smaller than a half of the width of the inner yoke portion 26. The width of the support protrusion 27 is designed to securely support the cover 50, which will be described below. The width of the support protrusion 27 cannot be larger than a half of the width of the inner yoke portion 26. This is because the support protrusions 27 of the inner yoke portions 26 are formed by dividing a portion of a base material, which is used to form the inner yoke portions 26, into halves to have a half of the width of the portion of the base material. When a path of a light beam is secured to test tracking performance, the width of the support protrusion 27 is further reduced.

Meanwhile, since the inner yoke portions 26 are formed by cutting and bending the portion of the base material, which is used to form the center vent 24, the support protrusions 27 of the inner yoke portions 26 are formed in the complementary positions. That is, when the inner yoke portions 26 facing each other are formed by cutting the base material with a limited length, the number of times of drawing process can be minimized, and the length of the inner yoke portions 26 can be extended as long as possible.

Outer yoke portions 28 are also formed upright on the base 22. The outer yoke portions 28 are formed to face each other to have an imaginary connection line connecting the outer yoke portions 28 substantially perpendicular to an imaginary connection line connecting the inner yoke portions 26. Magnets 48, which will be described below, are mounted on opposite side surfaces of the outer yoke portions 28.

In the meantime, the configuration of an actuator, in which the yoke 20 of the exemplary embodiment is employed, will be explained. The yoke 20 is installed on a frame 30. The yoke 20 is inserted into a mold for manufacturing the frame 30, and thus inserted and fixed into the frame 30, The frame 30 is made of synthetic resin. As shown in FIG. 2, the frame 30 surrounds one end of the base 22, and also surrounds the outer yoke portions 28 except for the opposite side surfaces and top end surfaces thereof.

A substrate 32 is installed on one side surface of the frame 30. The substrate 32 includes components or circuits for operating the actuator. There are provided wires 34 having one ends connected to the substrate 32 and extending through the frame 30. In this embodiment, all four wires 34 are used. The leading ends of the wires 34 are connected to a bobbin 36. The wires 34 serve to support the bobbin 36 and at the same time transfer electrical signals. That is, the wires 34 transfer the electrical signals between the substrate 32 and the bobbin 36.

The bobbin 36, which is formed in a generally hexahedral shape, is supported by the wires 34, thereby being installed movably in so-called tracking and focusing directions. Support protruding portions 38, through which the wires 34 pass, are formed at both ends of the bobbin 36. Connection substrates 40 are provided at both the ends of the bobbin 36, respectively. The ends of the wires 34 are electrically connected to the connection substrates 40. The connection substrates 40 are electrically connected to a tracking coil 42 and a focusing coil 44, which will be described below. An objective lens 46 for transferring the light emitted from a light source of the actuator to a signal recording surface of a disk is installed on the top surface of the bobbin 36.

In the meantime, the magnets 48 are respectively installed on the opposite side surfaces of the outer yoke portions 28. The magnets 48 electromagnetically interact with the tracking coil 42 and the focusing coil 44 to operate the bobbin 36. The magnets 48 installed on the outer yoke portions 28 face the tracking coil 42 and the focusing coil 44 of the bobbin 36, respectively. The inner yoke portions 26 are installed to pass through both ends of the bobbin 36 vertically.

The cover 50 is coupled to the frame 30 to protect the bobbin 36 and the like. A through hole 52 is formed in a center portion of the cover 50. The light emitted through the objective lens 46 can be transferred to the disk through the through hole 52, and the light reflected by the disk can be transferred to the objective lens 46 through the through hole 52.

The bottom surface of the cover 50 adjacent to the through hole 52 is brought into close contact with the support protrusions 27 of the yoke 20. As the cover 50 is brought into close contact with the support protrusions 27, the cover 50 can be firmly installed.

Hereinafter, a manufacturing process of the yoke with the aforementioned configuration in accordance with an exemplary embodiment of the present invention will be explained in detail.

Figure 3:
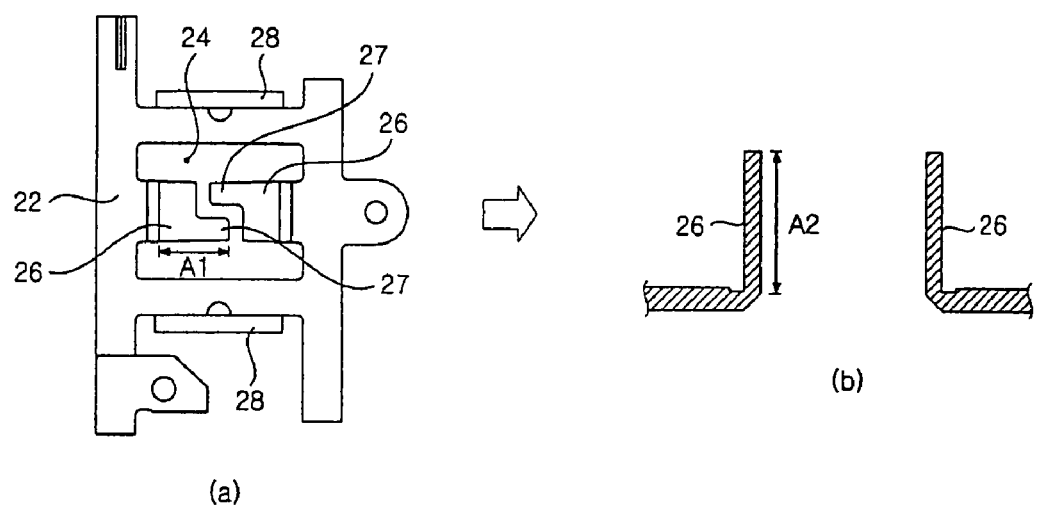
FIG. 3 is an explanatory view illustrating a major portion of a yoke during manufacturing thereof according to an exemplary embodiment of a manufacturing method of a yoke of the present invention.

FIG. 3 illustrates a major portion of the yoke 20 during a process of manufacturing the yoke 20 of the exemplary embodiment of the present invention. FIG. 3(a) is a plan view illustrating a state where the base 22 and the outer yoke portions 28 are formed by cutting a base material for manufacturing the yoke 20. However, in practice, a base material is not separately supplied, but continuously supplied in a long band shape so that a plurality of the yokes 20 are consecutively formed on the band-shaped base material at predetermined pitch intervals. Particularly, the processes of forming the yoke 20 are sequentially carried out in the progressive mold. Each process is performed in each position of the base material at the same time. Then, in order to form the center vent 24, a corresponding portion of the base material is removed. At this stage, the central portion of the base material is used to form the inner yoke portions 26. FIG. 3(a) shows a state where two side portions of the base material immediately adjacent to the central portion of the base material are removed, and the central portion of the base material, which is used to form the inner yoke portions 26, is still intact.

Subsequently, the central portion of the base material is cut into two pieces so that the support protrusions 27 are formed at the complementary positions of the leading ends of the inner yoke portions 26 corresponding to each other. In this exemplary embodiment shown in FIG. 3(a), a portion having a 'ㄴ' shape is removed from the central portion of the base material to separate the central portion of the base material into two pieces. That is, during the process of forming the inner yoke portions 26, the support protrusion 27 of one of the inner yoke portions 26 is formed to have a half of the width of the base material corresponding to the length of the inner yoke portion 26, and the support protrusion 27 of the other one of the inner yoke portions 26 is formed to have the other half. As shown in FIG. 3(a), the opposite support protrusions 27 are formed to face each other. Since each of the support protrusions 27 extend from the leading end of the corresponding inner yoke portion 26, the inner yoke portion 26 and the support protrusion 27 can be formed to have a total length A1 longer than a half of the total length of the central portion of the base material. In the exemplary embodiment, the length of the support protrusion 27 is about 1.4 times longer than that of the related art.

In addition, in order to secure the path of light beams for testing the tracking performance of the actuator, the width of the support protrusion 27 is preferably smaller than a half of the width of the base material corresponding to the length of the inner yoke portion 26.

Then, the two pieces, which are used to form the inner yoke portions 26, are bent upward with respect to the base 22. The length of the inner yoke portions 26 should have a designed value so that the support protrusions 27 can support the cover 50. In an embodiment, the inner yoke portions 26 can be further drawn once to have a desired length A2. When the inner yoke portions 26 undergo the drawing process, the thickness thereof is relatively reduced. Assuming that the thickness of the base material is '1 t', the thickness after the processing becomes '0.7 t'.

In a case where the support protrusions 27 are formed as shown in the exemplary embodiment of the present invention, the length of the inner yoke portions 26 is relatively less changed before and after the drawing process. That is, in this embodiment, the length A2 after the drawing process is about 1.4 to 1.8 times larger than the length A1 before the drawing process.

In the process of forming the inner yoke portions 26, the inner yoke portions 26 can be formed to have the desired length A2 by bending the portions upward with respect to the base 22 and simultaneously drawing the inner yoke portions 26.

Meanwhile, Table 1 shows changes of magnetic forces, i.e., focusing and tracking forces in a case where the inner yoke portions 26 of the present invention are used as compared with a case where the inner yoke portions in the related art are used.

TABLE 1

|  | Focusing force | Tracking force |
| --- | --- | --- |
| Related art | 3.7002E−02 | 3.1931E−02 |
| Embodiment 1 | 3.7107E−02 | 3.1974E−02 |
| Embodiment 2 | 3.6885E−02 | 3.1922E−02 |

In Table 1, the embodiment 1 and the embodiment 2 are different in the length of the support protrusions 27. Here, the embodiment 1 has the support protrusions 27 of about 1.8 mm in length, and the embodiment 2 has the support protrusions 27 of about 2.4 mm.

It can be understood from the results shown in Table 1 that the embodiments 1 and 2 and the related art are rarely different in the focusing and tracking forces. This means that even if the inner yoke portions 26 and the support protrusions 27 are changed in structure from the related art, the tracking and focusing performance is not substantially affected by such a change in structure.

Thus, according to the exemplary embodiment of the present invention, when forming the inner yoke portion 26, its length change can be minimized, and accordingly, the size control can be simplified without affecting the tracking and focusing performance.

According to the yoke and the manufacturing method thereof of the exemplary embodiments of the present invention so constructed, the following advantages can be achieved.

First, when the inner yoke portions facing each other are formed by cutting the base material, the support protrusions are formed to be located at the complementary positions of the leading ends of the inner yoke portions. Therefore, the degree or the number of times of the drawing process for setting up the length of the inner yoke portions including the support protrusions to the designed value can be minimized or omitted. The length and thickness changes of the portions, which are used to form the inner yoke portions, are minimized, so that the inner yoke portions can be easily manufactured in the designed size, thereby relatively improving the yoke in quality.

In addition, the support protrusions formed at the leading ends of the inner yoke portions are respectively formed at complementary positions, i.e., at one side ends of the leading ends of the inner yoke portions. Accordingly, in a state where the yoke is installed in an actuator, a reflecting plate can be installed in an objective lens side without interference with the support protrusions of the inner yoke portions. That is, the reflecting plate can be relatively easily attached through the combined space of the region in which the support protrusions are not formed and the outer region of the inner yoke portions.

Although the embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and appended claims. In addition to variations and modifications in the component parts and/or arrangements, alternative uses will also be apparent to those skilled in the art.

What is claimed is:

1. A yoke comprising:
 a base having a center vent;
 at least a pair of inner yoke portions respectively located at both end edges of the center vent and protruding from the base to face each other, each of the inner yoke portions having a support protrusion, the support protrusions being respectively located at complementary positions of leading ends of the corresponding inner yoke portions; and
 at least a pair of outer yoke portions protruding from the base and facing each other.

2. The yoke as claimed in claim 1, wherein each of the support protrusions is formed to be offset to a side with respect to a center of the leading end of a corresponding one of the inner yoke portions.

3. The yoke as claimed in claim 1, wherein a width of the support protrusions is smaller than a half of a width of the inner yoke portions.

4. The yoke as claimed in claim 1, wherein each of the inner yoke portions having a corresponding one of the support protrusions has a lateral side with a '└┐' shape.

5. The yoke as claimed in claim 1, wherein the pair of outer yoke portions face each other in a first direction, and the pair of inner yoke portions face each other in a second direction substantially perpendicular to the first direction.

* * * * *